(12) United States Patent
Lemma et al.

(10) Patent No.: US 7,546,466 B2
(45) Date of Patent: Jun. 9, 2009

(54) DECODING OF WATERMARKED INFORMATION SIGNALS

(75) Inventors: Aweke Negash Lemma, Eindhoven (NL); Javier Francisco Aprea, Eindhoven (NL); Leon Maria Van De Kerkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 874 days.

(21) Appl. No.: 10/509,413

(22) PCT Filed: Feb. 26, 2003

(86) PCT No.: PCT/IB03/00782

§ 371 (c)(1), (2), (4) Date: Sep. 23, 2004

(87) PCT Pub. No.: WO03/083857

PCT Pub. Date: Oct. 9, 2003

(65) Prior Publication Data

US 2005/0166068 A1     Jul. 28, 2005

(30) Foreign Application Priority Data

Mar. 28, 2002   (EP) .................................. 02076203

(51) Int. Cl.
*H04N 7/169*    (2006.01)
*H04N 7/171*    (2006.01)
*H04L 9/00*     (2006.01)
*H04K 1/00*     (2006.01)
*G06K 9/00*     (2006.01)

(52) U.S. Cl. .................. 713/176; 380/201; 380/252; 382/100; 726/32

(58) Field of Classification Search ................. 713/176; 380/252, 201; 382/100; 726/32
See application file for complete search history.

(56) References Cited

U.S. PATENT DOCUMENTS

| 6,078,664 | A  | * | 6/2000  | Moskowitz et al. ........... 380/28  |
| 6,330,673 | B1 | * | 12/2001 | Levine ....................... 713/176 |
| 6,425,082 | B1 | * | 7/2002  | Matsui et al. ................ 713/176 |
| 6,674,876 | B1 | * | 1/2004  | Hannigan et al. ............ 382/100 |
| 6,952,774 | B1 | * | 10/2005 | Kirovski et al. ............. 713/176 |
| 7,020,285 | B1 | * | 3/2006  | Kirovski et al. ............. 380/238 |
| 7,114,071 | B1 | * | 9/2006  | Chmounk et al. ........... 713/164 |
| 7,131,007 | B1 | * | 10/2006 | Johnston et al. ............. 713/173 |
| 2002/0006203 | A1 | * | 1/2002 | Tachibana et al. ........... 380/269 |
| 2002/0116618 | A1 | * | 8/2002 | Muratani ..................... 713/176 |

OTHER PUBLICATIONS van der Veen, Michiel et al. "Robust, Multi-functional and High-quality Audio Watermarking Technology", May 12-15, 2001.*
Bassie, Paraskevi et al. "Robust Audio Watermarking in the Time Domain", 2001 IEEE.*

* cited by examiner

*Primary Examiner*—Michael J Simitoski
(74) *Attorney, Agent, or Firm*—Larry Liberchuk

(57) ABSTRACT

Method and apparatus are described for compensating for time offset in a received signal, so as to correctly align the frame sequence of a received signal to a sequence of transmitted symbols. Each symbol extends over $T_s$ signal samples. The received signal is first divided into a sequence of frames of length $T_s$, and then each frame divided into a multiplicity of $N_b$ sub-frames. Subsequently, $N_b$ sequences of values are formed, where every successive value in each sequence is derived from the corresponding sub-frame within each successive frame. Each of the $N_b$ sequences is an estimate for the correctly aligned sequence of transmitted symbols.

15 Claims, 12 Drawing Sheets

DECODING OF WATERMARKED INFORMATION SIGNALS

The present invention relates to apparatus and methods for decoding information that has been embedded in information signals, such as audio, video or data signals.

Watermarking of information signals is a technique for the transmission of additional data along with the information signal. For instance, watermarking techniques can be used to embed copyright and copy control information into audio signals.

The main requirement of a watermarking scheme is that it is not observable (i.e. in the case of an audio signal, it is inaudible) whilst being robust to attacks to remove the watermark from the signal (e.g. removing the watermark will damage the signal). It will be appreciated that the robustness of a watermark will normally be a trade off against the quality of the signal in which the watermark is embedded. For instance, if a watermark is strongly embedded into an audio signal (and is thus difficult to remove) then it is likely that the quality of the audio signal will be reduced.

Various types of audio watermarking schemes have been proposed, each with its own advantages and disadvantages. For instance, one type of audio watermarking scheme is to use temporal correlation techniques to embed the desired data (e.g. copyright information) into the audio signal. This technique is effectively an echo-hiding algorithm, in which the strength of echo is determined by solving a quadratic equation. The quadratic equation is generated by auto-correlation values at two positions: one at delay equal to $\tau$, and one at delay equal to 0. At the detector, the watermark is extracted by determining the ratio of the auto correlation function at the two delay positions.

WO 00/00969 in the name of Aris Technologies describes a technique for embedding or encoding auxiliary signals into an information host or cover signal. A replica of the cover signal, or a portion of the cover signal in a particular domain (time, frequency or space), is generated according to a stego key, which specifies modification values to the parameters of the cover signal. The replica signal is then modified by an auxiliary signal corresponding to the information to be embedded, and inserted back into the cover signal so as to form the stego signal.

At the decoder, in order to extract the original auxiliary data, a replica of the stego signal is generated in the same manner as the replica of the original cover signal, and requires the use of the same stego key. The resulting replica is then correlated with the received stego signal, so as to extract the auxiliary signal. The extraction of the auxiliary signal is relatively complex, and requires the stego key at both the encoder (or embedder) and decoder (or detector). Additionally, a brute force search is required to synchronize to the auxiliary signal at the detector.

Further, performance of the payload extraction is dependent on how well the auxiliary signal can be estimated. In a system with a high expected error rate of the payload bits in the auxiliary signal, this is very difficult to achieve. Solutions would lead to very complex error correction methods, or significantly limit the information capacity.

It is an object of the present invention to provide a compensation for time offset for a watermark decoding scheme that substantially addresses at least one of the problems of the prior art.

In a first aspect, the present invention provides a method of compensating for offset in a received signal, the signal being modified by a sequence of symbols, each symbol extending over $T_s$ signal samples, the method comprising the steps of:

(a) dividing the received signal into frames of predetermined length $T_s$; (b) dividing each frame into a plurality of $N_b$ sub-frames; (c) forming $N_b$ sequences of values, the values being derived from the corresponding sub-frame within each frame; and (d) taking said $N_b$ sequences as successive estimates of a frame sequence correctly aligned (with no offset) to the sequence of symbols.

Preferably, each frame overlaps an adjacent frame.

Preferably, each sub-frame overlaps an adjacent sub-frame.

Preferably, $N_b$ lies within the range 2 to 8.

Preferably, the sequence of symbols comprises $L_w$ symbols, the received signal being divided into $L_F$ frames, wherein $L_F$ is an integer multiple of $T_s \cdot L_w$.

Preferably, each symbol of the said sequence extends over $T_s$ samples.

Preferably, said symbols are shaped with a window shaping function that has a band limited frequency behavior and, within the pass band, has a smooth (graceful) temporal behavior. Further, the window shaping function preferably has a symmetric or anti-symmetric temporal behavior.

Preferably, said window shaping function is one of raised cosine functions or bi-phase functions.

Preferably, said offset is a time offset between the received and the transmitted signals.

Preferably, the method further comprises processing each estimate generated in step (d) as though it was the correctly aligned frame sequence, so as to determine which estimate is the best estimate.

The method preferably further comprises the step of correlating each of said estimates with a reference sequence corresponding to said sequence of symbols; and taking the estimate with the maximum correlation peak value as the best estimate.

Preferably, the best estimate is assumed to be the first estimate that, when processed, exceeds one or more predetermined conditions. Preferably, the processing of estimates stops once a working estimate has been determined.

Preferably, once a working estimate has been determined for a first signal or portion of a signal, the method is repeated for a further received signal or portion of a signal, the estimates from said further signal being processed in an order dependent upon said first best estimate. Thus the method can adaptively correct for offset.

In a further aspect, the present invention provides a computer program arranged to perform the above method.

In another aspect, the present invention provides a record carrier comprising the above computer program.

In a further aspect, the present invention provides a method of making available for downloading the above computer program.

In another aspect, the present invention provides an apparatus arranged to compensate for offset in a received signal, the signal being modified by a sequence of symbols, each symbol extending over $T_s$ signal samples, the apparatus comprising: a divider arranged to divide the received signal into frames of preferable length $T_s$; a divider arranged to divide each frame into a plurality of $N_b$ sub-frames; and a processor arranged to form $N_b$ sequences of values, the values being derived from the corresponding sub-frame within each frame; and to take said $N_b$ sequences as successive estimates of a frame sequence correctly aligned (with no offset) to the sequence of symbols.

For a better understanding of the invention, and to show how embodiments of the same may be carried into effect, reference will now be made, by way of example, to the accompanying diagrammatic drawings in which.

Figure 12:
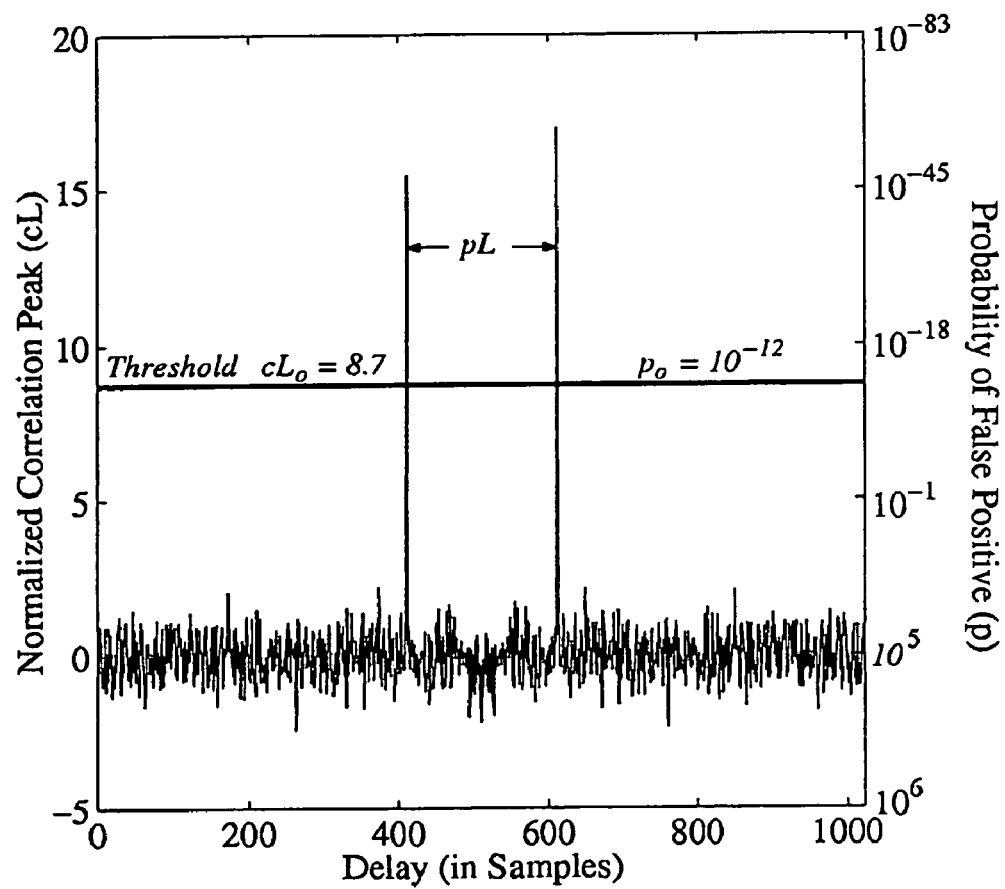
Figure 8:
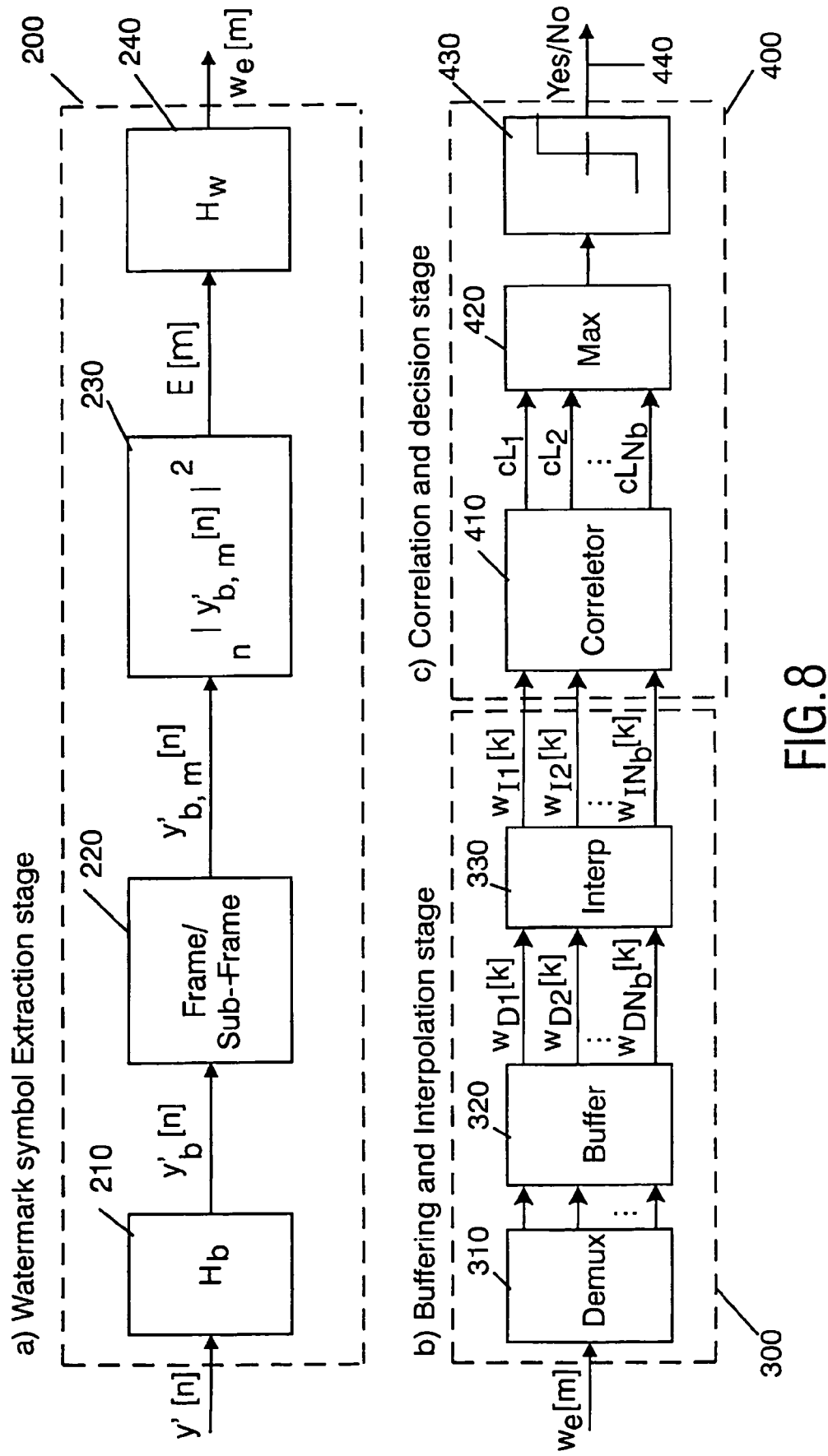
FIG. 8 is a diagram illustrating a watermark detector in accordance with an embodiment of the present invention.
Figure 9:
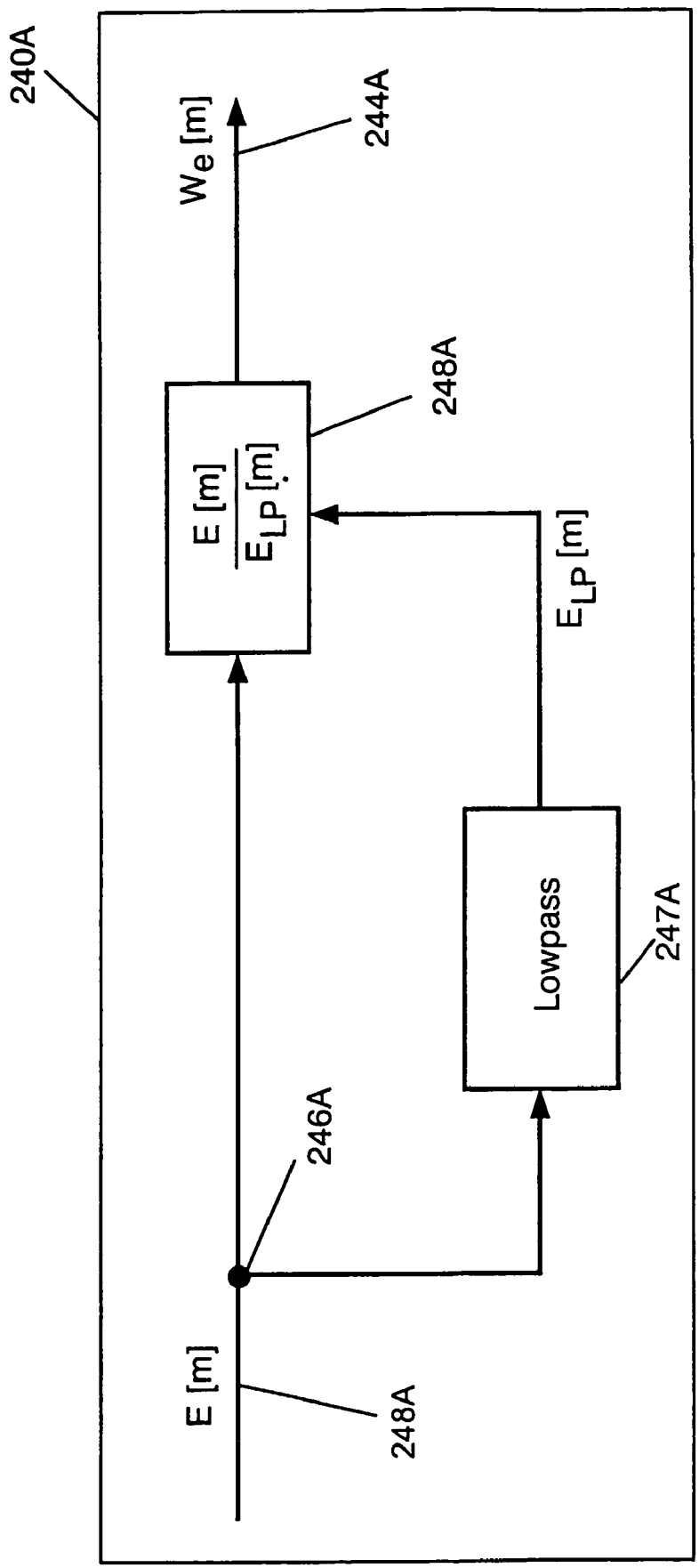
Figure 10:
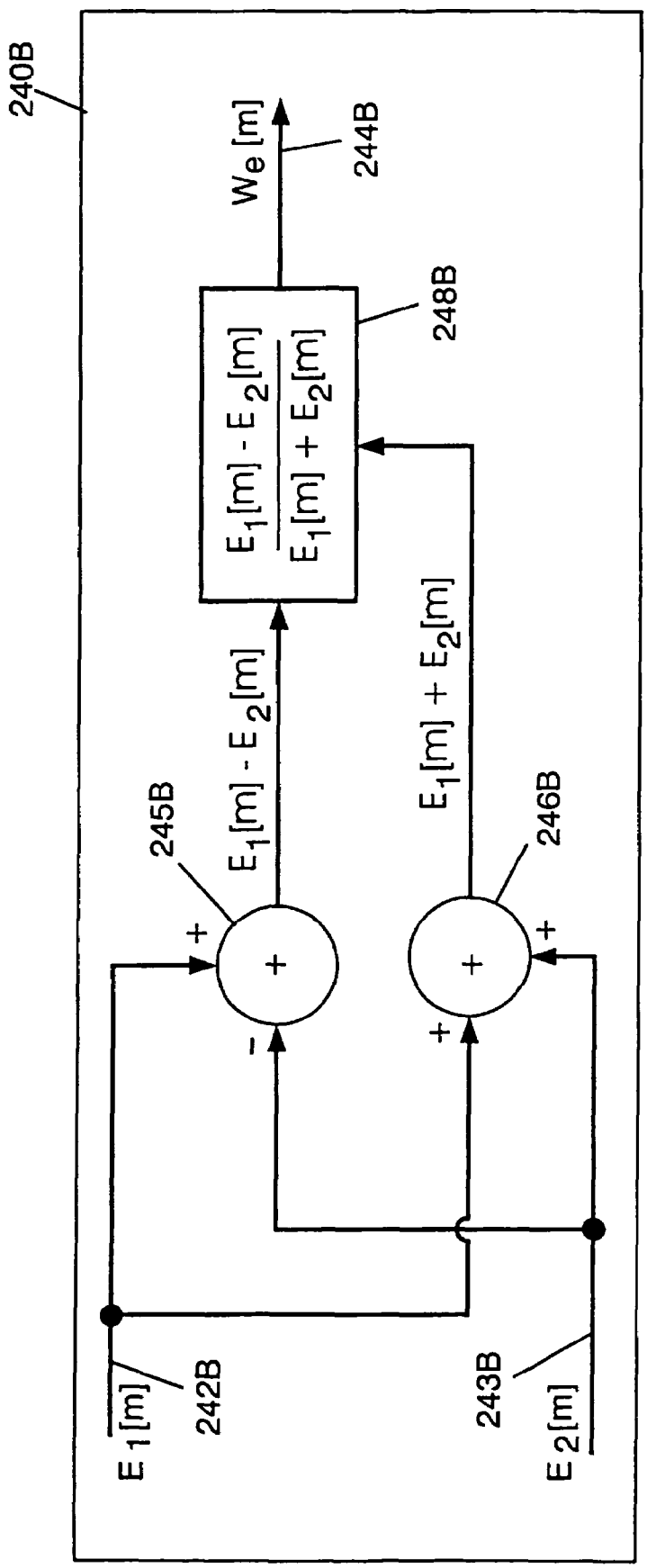
Figure 11:
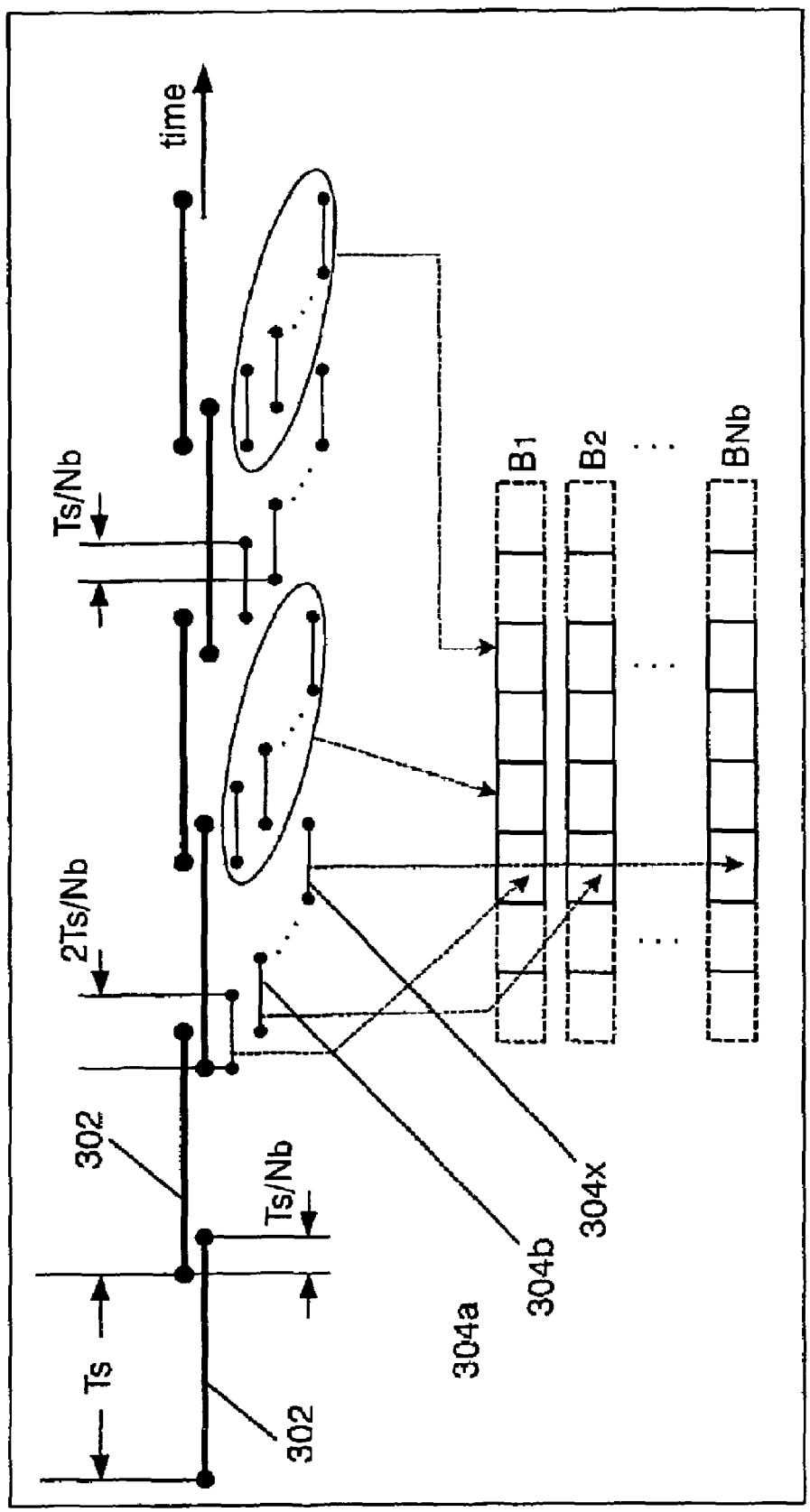
Figure 13:
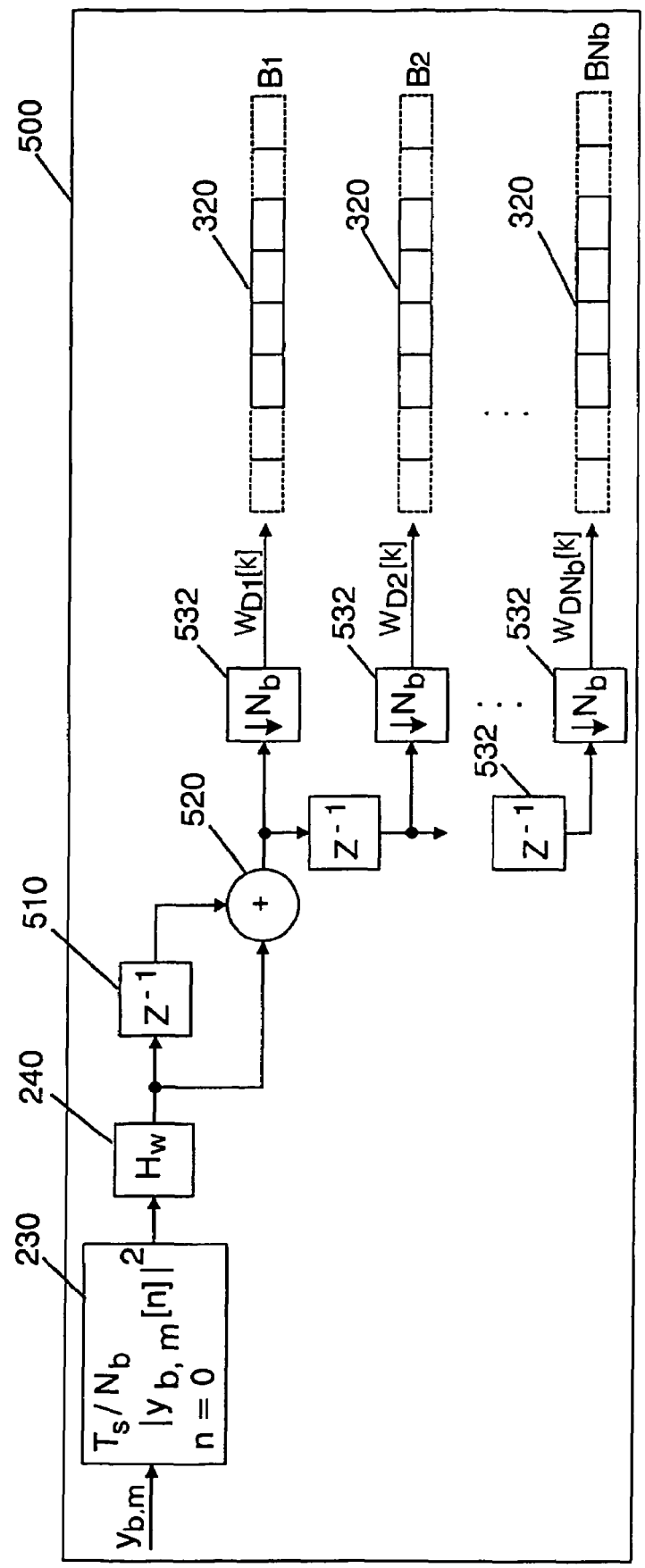

FIG. 9 diagrammatically shows the whitening filter $H_w$ of FIG. 8, for use in conjunction with a raised cosine shaping window function;

FIG. 10 diagrammatically shows the whitening filter $H_w$ of FIG. 8, for use in conjunction with a bi-phase window shaping function;

FIG. 11 shows details of the watermark symbol extraction and buffering processes in accordance with an embodiment of the present invention;

FIG. 12 shows a typical shape of the correlation function output from the correlator of the watermark detector shown in FIG. 8; and FIG. 13 shows an example of one preferred implementation of the symbol extraction and buffering stage.

Figure 1:
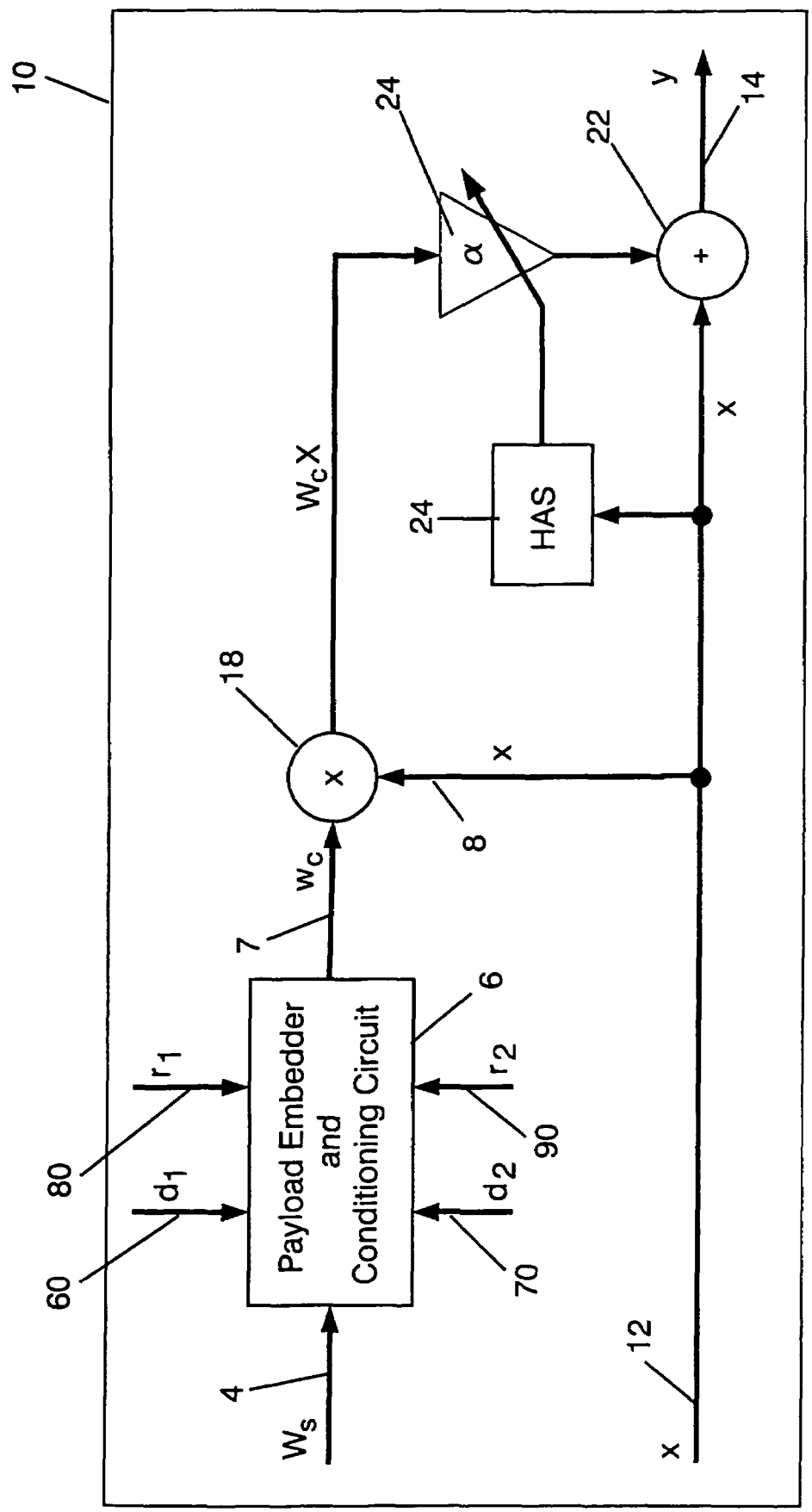
FIG. 1 is a diagram illustrating a watermark embedding apparatus.

FIG. 1 shows a block diagram of the apparatus required to perform the digital signal processing for embedding a multi-bit payload watermark w into a host signal x.

A host signal x is provided at an input 12 of the apparatus. The host signal x is passed in the direction of output 14 via the adder 22. However, a replica of the host signal x (input 8) is split off in the direction of the multiplier 18, for carrying the watermark information.

The watermark signal $w_c$ is obtained from the payload embedder and watermark conditioning apparatus 6, and derived from a reference finite length random sequence $w_s$ input to the payload embedder and watermark conditioning apparatus. The multiplier 18 is utilized to calculate the product of the watermark signal $w_c$ and the replica audio signal x. The resulting product, $w_c$x is then passed via a gain controller 24 to the adder 22. The gain controller 24 is used to amplify or attenuate the signal by a gain factor α.

The gain factor α controls the trade off between the audibility and the robustness of the watermark. It may be a constant, or variable in at least one of time, frequency and space. The apparatus in FIG. 1 shows that, when α is variable, it can be automatically adapted via a signal analyzing unit 26 based upon the properties of the host signal x. Preferably, the gain a is automatically adapted, so as to minimize the impact on the signal quality, according to a properly chosen perceptibility cost-function, such as a psycho-acoustic model of the human auditory system (HAS) in case of an audio signal. Such a model is, for instance, described in the paper by E. Zwicker, "Audio Engineering and Psychoacoustics: Matching signals to the final receiver, the Human Auditory System", Journal of the Audio Engineering Society, Vol. 39, pp. Vol. 115-126, March 1991.

In the following, an audio watermark is utilized, by way of example only, to describe this embodiment of the present invention.

The resulting watermark audio signal y is then obtained at the output 14 of the embedding apparatus 10 by adding an appropriately scaled version of the product of $w_c$ and x to the host signal:

$$y[n]=x[n]+\alpha w_c[n]x[n]. \quad (1)$$

Preferably, the watermark $w_c$ is chosen such that when multiplied with x, it predominantly modifies the short time envelope of x.

Figure 2:
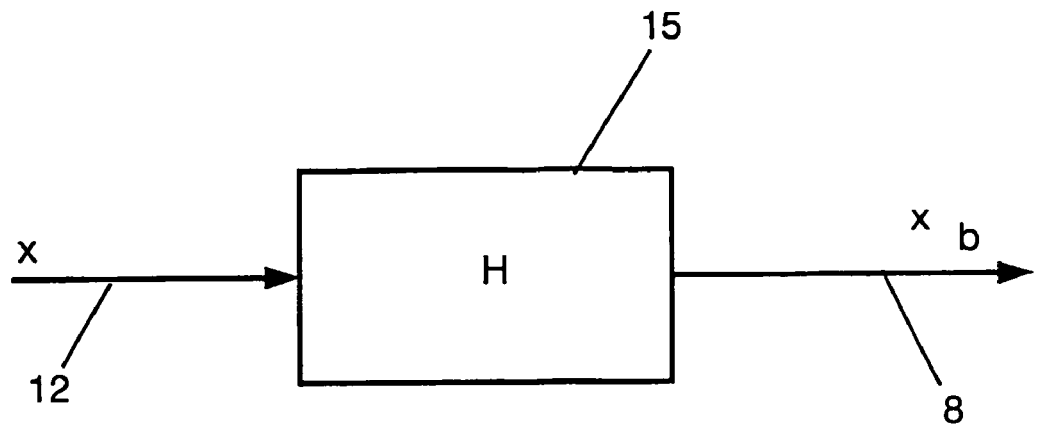
FIG. 2 shows a signal portion extraction filter H.

FIG. 2 shows one preferred embodiment in which the input 8 to the multiplier 18 in FIG. 1 is obtained by filtering a replica of the host signal x using a filter H in the filtering unit 15. If the filter output is denoted by $x_b$, then according to this preferred embodiment, the watermark signal is generated by adding the product of $x_b$ and the watermark $w_c$ to the host signal x:

$$y[n]=x+\alpha w_c[n]x_b[n]. \quad (2)$$

Let $\bar{x}_b$ be defined such that $\bar{x}_b = x - x_b$, and $y_b$ be defined such that $y=y_b+\bar{x}_b$, then the envelope modulated portion $y_b$ of the watermarked signal y is given as $$y_b[n]=(1+w_c[n])x_b[n] \quad (3)$$

Figures 3A, 3B:
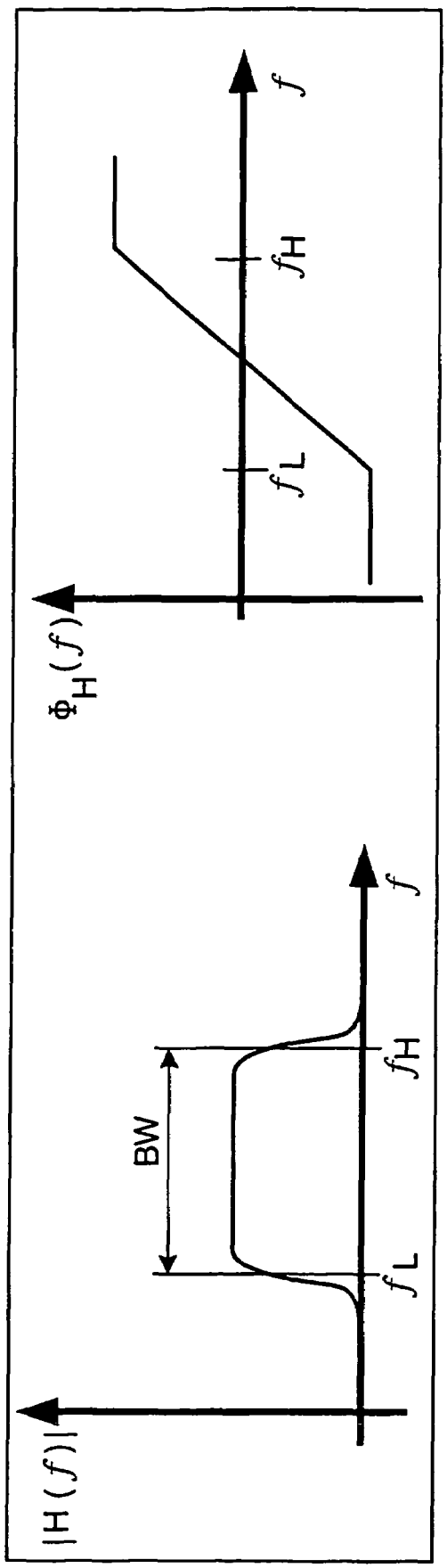
FIGS. 3a and 3b show respectively the typical amplitude and phase responses as a function of frequency of the filter H shown in FIG. 2.

Preferably, as shown in FIG. 3, the filter H is a linear phase band pass filter characterized by its lower cut-off frequency $f_L$ and upper cut-off frequency $f_H$. As can be seen in FIG. 3(b), the filter H has a linear phase response with respect to frequency f within the pass-band (BW). Thus, when H is a band pass filter, $x_b$ and $\bar{x}_b$ are the in-band and out-of-band components of the host signal respectively. For optimum performance, it is preferable that the signals $x_b$ and $\bar{x}_b$ are in phase. This is achieved by appropriately compensating for the phase distortion produced by filter H. In the case of a linear phase filter, the distortion is a simple time delay.

Figure 4:
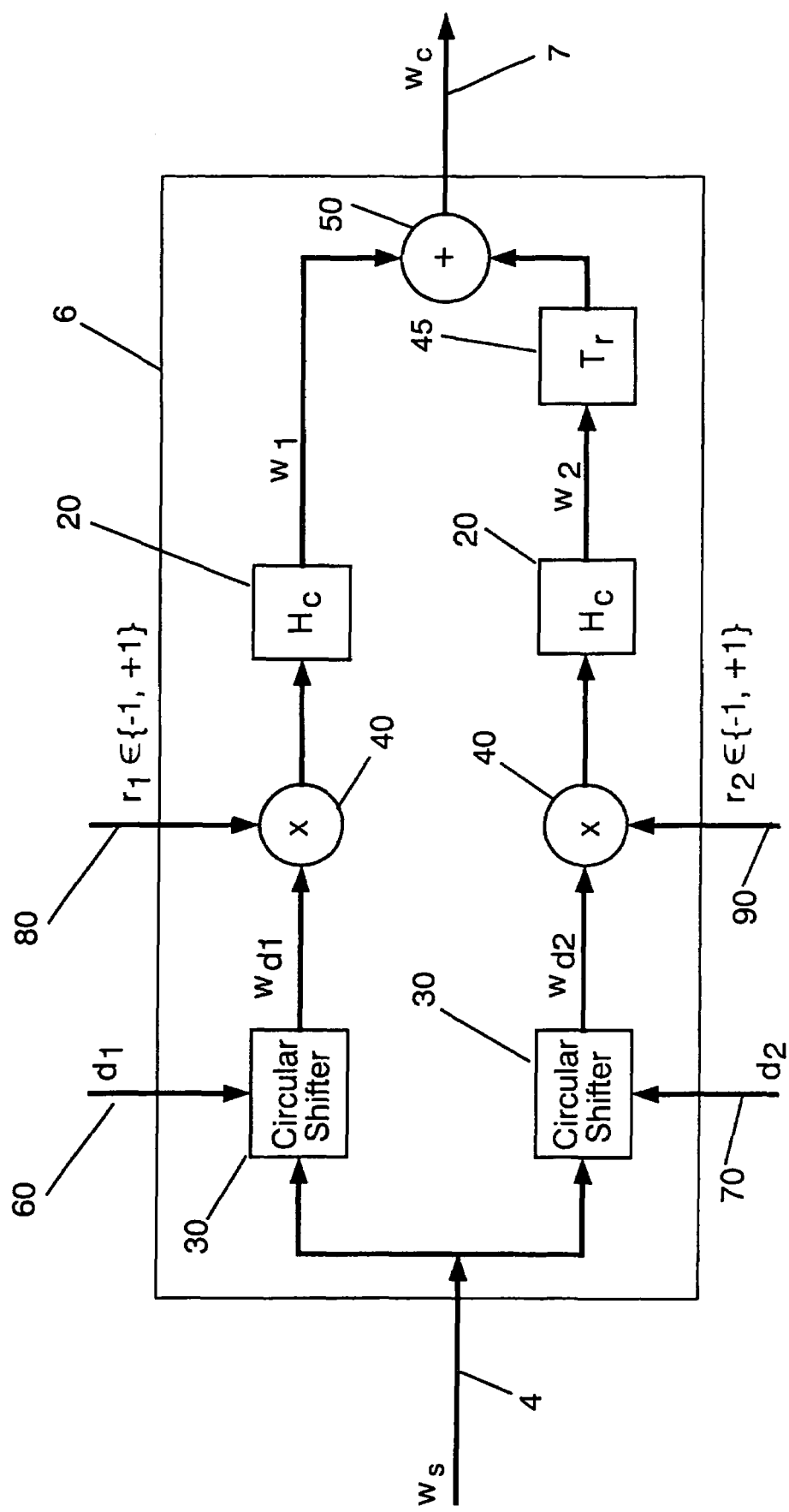
FIG. 4 shows the payload embedding and watermark conditioning stage of the apparatus shown in FIG. 1.

In FIG. 4, the details of the payload embedder and watermark conditioning unit 6 is shown. In this unit, the initial reference random sequence w, is converted into a multi-bit watermark signal $w_c$.

Firstly a finite length, preferably zero mean and uniformly distributed random sequence $w_s$, from now on also referred to as the watermark seed signal, is generated using a random number generator with an initial seed S. As will be appreciated later, it is preferable that this initial seed S is known to both the embedder and the detector, such that a copy of the watermark signal can be generated at the detector for comparison purposes. This results in the sequence of length $L_w$.

$$w_s[k] \in [-1,1], \text{ for } k=0, 1, 2, \ldots, L_w-1 \quad (4)$$

It should be noted that in some applications, the seed can be transmitted to the detector via an alternate channel or can be derived from the received signal using some pre-determined protocol.

Then the sequence $w_s$ is circularly shifted by the amounts $d_1$ and $d_2$ using the circularly shifting unit 30 to obtain the random sequences $w_{d1}$ and $w_{d2}$ respectively. It will be appreciated that these two sequences ($w_{d1}$ and $w_{d2}$) are effectively a first sequence and a second sequence, with the second sequence being circularly shifted with respect to the first. Each sequence $w_{di}$, i=1,2, is subsequently multiplied with a respective sign bit $r_i$, in the multiplying unit 40, where $r_i$=+1 or −1. The respective values of $r_1$ and $r_2$ remain constant, and only change when the payload of the watermark is changed. Each sequence is then converted into a periodic, slowly varying narrow-band signal $w_i$ of length $L_w T_s$ by the watermark conditioning circuit 20 shown in FIG. 4. Finally, the slowly varying narrow-band signals $w_1$ and $w_2$ are added with a relative delay $T_r$ (where $T_r<T_s$) to give the multi-bit payload watermark signal $w_c$. This is achieved by first delaying the signal $w_2$ by the amount $T_r$ using delaying unit 45 and subsequently by adding it to $w_1$ with the adding unit 50.

Figure 5:
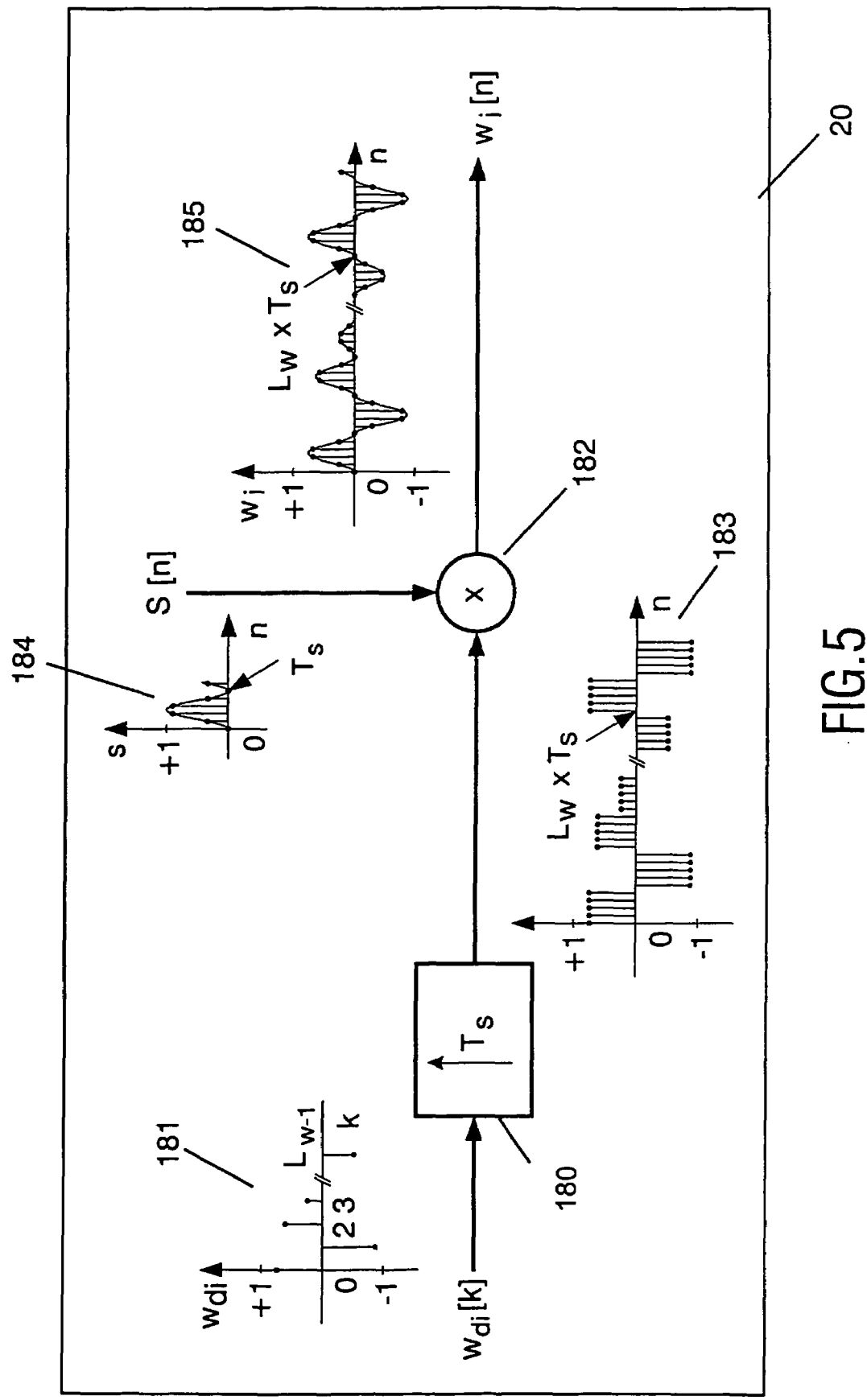
FIG. 5 is a diagram illustrating the details of the watermark conditioning apparatus $H_c$ of FIG. 4, including charts of the associated signals at each stage.

FIG. 5 shows the watermark conditioning apparatus 20 used in the payload embedder and watermark conditioning apparatus 6 in more detail. The watermark seed signal $w_s$ is input to the conditioning apparatus 20.

For convenience, the modification of only one of the sequences $w_{di}$ is shown in FIG. 5, but it will be appreciated that each of the sequences is modified in a similar manner, with the results being added to obtain the watermark signal $w_c$.

As shown in FIG. 5, each watermark signal sequence $w_{di}[k]$, i=1,2 is applied to the input of a sample repeater 180. Chart 181 illustrates one of the sequences $w_{di}$ as a sequence of values of random numbers between +1 and −1, with the sequence being of length $L_w$. The sample repeater repeats each value within the watermark seed signal sequence $T_s$ times, so as to generate a rectangular pulse train signal. $T_s$ is referred to as the watermark symbol period and represents the span of the watermark symbol in the audio signal. Chart 183 shows the results of the signal illustrated in chart 181 once it has passed through the sample repeater 180.

A window shaping function s[n], such as a raised cosine window, is then applied to convert the rectangular pulse functions derived from $w_{d1}$ and $w_{d2}$ into slowly varying watermark sequence functions $w_1[n]$ and $w_2[n]$ respectively.

Chart 184 shows a typical raised cosine window shaping function, which is also of span $T_s$.

The generated watermark sequences $w_1[n]$ and $w_2[n]$ are then added up with a relative delay $T_r$ (where $T_r<T_s$) to give the multi-bit payload watermark signal $w_c[n]$ i.e., $$w_c[n]=w_1[n]+w_2[n-T_r] \quad (5)$$

The value of $T_r$ is chosen such that the zero crossings of $w_1$ match the maximum amplitude points of $w_2$ and vice-versa. Thus, for a raised cosine window shaping function $T_r=T_s/2$, and for a bi-phase window shaping function $T_r=T_s/4$. For other window shaping functions, other values of $T_r$ are possible.

As will be appreciated by the below description, during detection the correlation of $w_c[n]$ will generate two correlation peaks that are separated by pL' (as can be seen in FIG. 12). pL' is an estimate of the circular shift pL between $w_{d1}$ and $w_{d2}$, which is part of the payload, and is defined as $$pL=|d_2-d_1| \bmod ([L_w/2]) \quad (6)$$

In addition to pL, extra information can be encoded by changing the relative signs of the embedded watermarks.

In the detector, this is seen as a relative sign $r_{sign}$ between the correlation peaks. It may be defined as:

$$r_{sign} = \frac{2 \cdot \rho_1 + \rho_2 + 3}{2} \in \{0, 1, 2, 3\} \quad (7)$$

where $\rho_1=\mathrm{sign}(cL_1)$ and $\rho_2=\mathrm{sign}(cL_2)$ are respectively estimates of the sign bits $r_1$ (input 80) and $r_2$ (input 90) of FIG. 4, and $cL_1$ and $cL_2$ are the values of the correlation peak corresponding to $w_{d1}$ and $w_{d2}$ respectively. The overall watermark payload $pL_w$, for an error-free detection, is then given as a combination of $r_{sign}$ and pL:

$$pL_w=<r_{sign}, pL>. \quad (8)$$

The maximum information ($I_{max}$) in number of bits, that can be carried by a watermark sequence of length $L_w$ is thus given by:

$$I_{max}=\log_2(4 \cdot [L_w/2]) \text{ bits} \quad (9)$$

In such a scheme, the payload is immune to relative offset between the embedder and the detector, and also to possible time scale modifications.

Figures 6A, 6B:
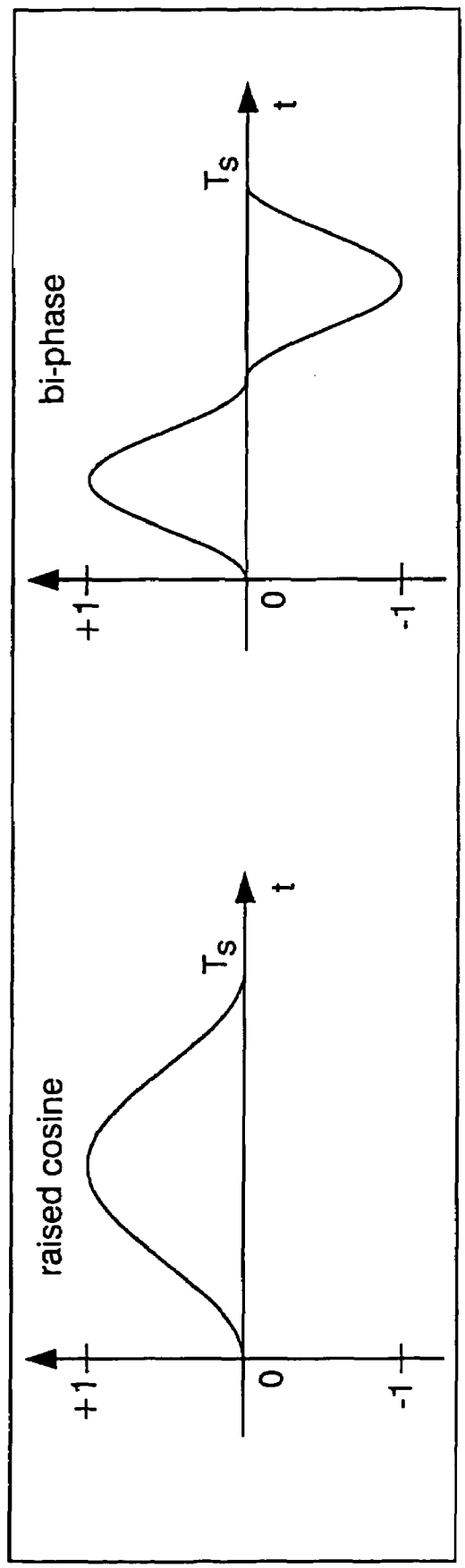
FIGS. 6a and 6b show two preferred alternative window shaping functions s(n) in the form of respectively a raised cosine function and a bi-phase function.

The window shaping function has been identified as one of the main parameters that controls the robustness and audibility behavior of the present watermarking scheme. As illustrated in FIGS. 6a and b, two examples of possible window shaping functions are herein described—a raised cosine function and a bi-phase function.

Figures 7A, 7B:
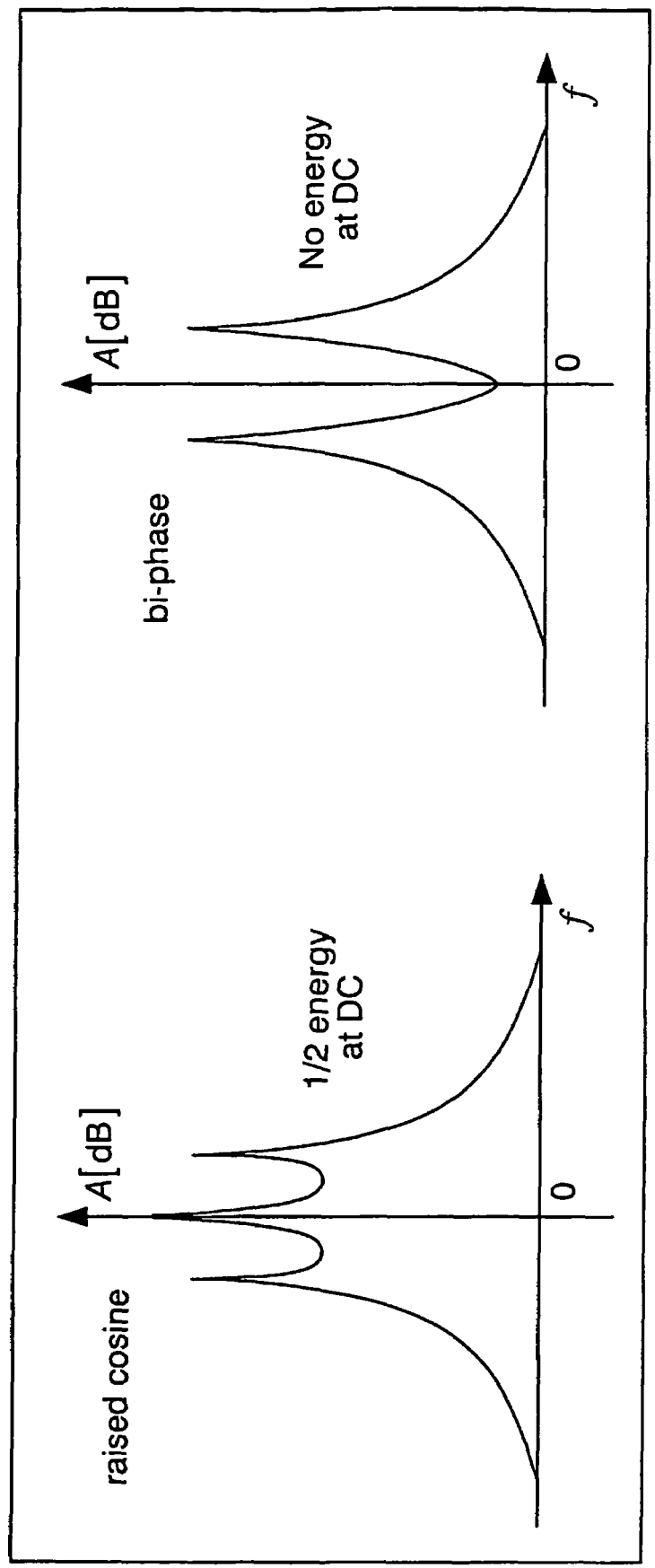
FIGS. 7a and 7b show respectively the frequency spectra for a watermark sequence conditioned with a raised cosine and a bi-phase shaping window function.

It is preferable to use a bi-phase window function instead of a raised cosine window function, so as to obtain a quasi DC-free watermark signal. This is illustrated in FIGS. 7a and 7b, showing the frequency spectra corresponding to a watermark sequence (in this case a sequence of $w_{di}[k]=\{1,1,-1,1,-1,-1,\}$) conditioned with respectively a raised cosine and a bi-phase window shaping function. As can be seen, the frequency spectrum for the raised cosine conditioned watermark sequence has a maximum at frequency f=0, whilst the frequency spectrum for the bi-phase shaped watermark sequence has a minimum at f=0 i.e. it has very little DC component.

Useful information is only contained in the non-DC component of the watermark. Consequently, for the same added watermark energy, a watermark conditioned with the bi-phase window will carry more useful information than one conditioned by the raised cosine window. As a result, the bi-phase window offers superior audibility performance for the same robustness or, conversely, it allows a better robustness for the same audibility quality.

Such a bi-phase function could be utilized as a window shaping function for other watermarking schemes. In other words, a bi-phase function could be applied to reduce the DC component of signals (such as a watermark) that are to be incorporated into another signal.

FIG. 8 shows a block diagram of a watermark detector (200, 300, 400). The detector consists of three major stages: (a) the watermark symbol extraction stage (200), (b) the buffering and interpolation stage (300), and (c) the correlation and decision stage (400).

In the symbol extraction stage (200), the received watermarked signal y'[n] is processed to generate multiple ($N_b$) estimates of the watermarked sequence. These estimates of the watermark sequence are required to resolve time offset that may exist between the embedder and the detector, so that the watermark detector can synchronize to the watermark sequence inserted in the host signal.

In the buffering and interpolation stage (300), these estimates are de-multiplexed into $N_b$ separate buffers, and an interpolation is applied to each buffer to resolve time scale modifications that may have occurred, e.g. a drift in sampling (clock) frequency may have resulted in a stretch or shrink in the time domain signal (i.e. the watermark may have been stretched or shrunk).

In the correlation and decision stage (400), the content of each buffer is correlated with the reference watermark and the maximum correlation peaks are compared against a threshold to determine the likelihood of whether the watermark is indeed embedded within the received signal y'[n].

In order to maximize the accuracy of the watermark detection, the watermark detection process is typically carried out over a length of received signal y'[n] that is 3 to 4 times that of the watermark sequence length. Thus each watermark symbol to be detected can be constructed by taking the average of several estimates of said symbol. This averaging process is referred to as smoothing, and the number of times the averaging is done is referred to as the smoothing factor $s_f$. Let $L_D$ be the detection window length, defined as the length of the audio segment (in number of samples) over which a watermark detection truth-value is reported. Then, $L_D = s_f L_w T_s$, where $T_s$ is the symbol period and $L_w$ the number of symbols within the watermark sequence. During symbol extraction, a factor $T_s$ decimation takes place in the energy computation stage. Thus, the length ($L_b$) of each buffer 320 within the buffering and interpolation stage is $L_b = s_f L_w$.

In the watermark symbol extraction stage 200 shown in FIG. 8, the incoming watermark signal y'[n] is input to the optional signal conditioning filter $H_b$ (210). This filter 210 is typically a band pass filter and has the same behavior as the corresponding filter (H, 15) shown in FIG. 2. The output of the filter $H_b$ is y'$_b$[n] and, assuming linearity within the transmission medium, it follows from equations (1) and (3):

$$y'_b[n] \approx y_b[n] = (1 + \alpha w[n]) x_b[n] \quad (10)$$

Note that in the above expression, the possible time offset between the embedder and the detector is implicitly ignored. For ease of explanation of the general watermarking scheme principles, from now on, it is assumed that there is perfect synchronism between the embedder and the detector (i.e. no offset). Explanation is given however below in reference to FIG. 11 of how to compensate for time offset in accordance with the present invention.

Note that when no filter is used in the embedder (i.e., when H=1) then $H_b$ in the detector can also be omitted, or it can still be included to improve the detection performance. If $H_b$ is omitted, then $y_b$ in equation (10) is replaced with y. The rest of the processing is the same.

We assume that the audio signal is divided into frames of length $T_s$, and that y'$_{b,m}$[n] is the n-th sample of the m-th filtered frame signal. The energy E[m] corresponding to the m-th frame is:

$$E[m] = \sum_{n=0}^{T_s-1} |y'_{b,m}[n]|^2 \quad (11)$$

Combining this with equation 10, it follows that:

$$E[m] \approx \sum_{n=0}^{T_s-1} |y_{b,m}[n]|^2 = \sum_{n=0}^{T_s-1} |(1 + \alpha w_e[m]) x_{b,m}[n]|^2 \quad (12)$$

where $w_e[m]$ is the m-th extracted watermark symbol and contains $N_b$ time-multiplexed estimates of the embedded watermark sequences Solving for $w_e[m]$ in equation 12 and ignoring higher order terms of $\alpha$, gives the following approximation:

$$w_e[m] \approx \frac{1}{2\alpha} \left( \frac{\sum_{n=0}^{T_s-1} |y_{b,m}[n]|^2}{\sum_{n=0}^{T_s-1} |x_{b,m}[n]|^2} - 1 \right) \quad (13)$$

In the watermark extraction stage 200 shown in FIG. 8, the output y'$_b$[n] of the filter $H_b$ is provided as an input to a frame divider 220, which divides the audio signal into frames of length $T_s$ i.e. into y'$_{b,m}$[n], with the energy calculating unit 230 then being used to calculate the energy corresponding to each of the framed signals as per equation (12). The output of this energy calculation unit 230 is then provided as an input to the whitening stage $H_w$ (240) which performs the function shown in equation 13 so as to provide an output $w_e[m]$. Alternative implementations (240A, 240B) of this whitening stage are illustrated in FIGS. 9 and 10.

It will be realized that the denominator of equation 13 contains a term that requires knowledge of the host (original) signal x. As the signal x is not available to the detector, it means that in order to calculate $w_e[m]$ then the denominator of equation 13 must be estimated.

Below is described how such an estimation can be achieved for the two described window shaping functions (the raised cosine window shaping function and the bi-phase window shaping), but it will equally be appreciated that the teaching could be extended to other window shaping functions.

In relation to the raised cosine window shaping function shown in FIG. 6a, it has been realized that the audio envelope induced by the watermark contributes only to the noisy part of the energy function E[m]. The slowly varying part (i.e. the low frequency components) is predominately due to the contribution of the envelope of the original audio signal x. Thus, equation 13 may be approximated by:

$$w_e[m] \approx \frac{1}{2\alpha} \left( \frac{E[m]}{lowpass(E[m])} - 1 \right) \quad (14)$$

where "lowpass(.)" is a low pass filter function. Thus, it will be appreciated that the whitening filter $H_w$ for the raised cosine window shape in the function can be realized as shown in FIG. 9.

As can be seen, such a whitening filter $H_w$ (240A) comprises an input 242A for receiving the signal E[m]. A portion of this signal is then passed through the low pass filter 247A to produce a low pass filtered energy signal $E_{LP}[m]$, which in turn is provided as an input to the calculation stage 248A along with the function E[m]. The calculation stage 248A then divides E[m] by $E_{LP}[m]$ to calculate the extracted watermark symbol $w_e[m]$.

When a bi-phase window function is employed in the watermark conditioning stage of the embedder, a different approach should be utilized to estimate the envelope of the original audio, and hence to calculate $w_e[m]$.

It will be seen by examination of the bi-phase window function shown in FIG. 6b, that when the audio envelope is modulated with such a window function, the first and the second halves of the frame are scaled in opposite directions. In the detector, this property is utilized to estimate the envelope energy of the host signal x.

Consequently, within the detector, each audio frame is first sub-divided into two halves. The energy functions corresponding to the first and second half-frames are hence given by $$E_1[m] = \sum_{n=0}^{T_s/2-1} |y'_{b,m}[n]|^2 \text{ and} \quad (15)$$

-continued $$E_2[m] = \sum_{n=T_s/2}^{T_s-1} |y'_{b,m}[n]|^2 \quad (16)$$

respectively. As the envelope of the original audio is modulated in opposite directions within the two sub-frames, the original audio envelope can be approximated as the mean of $E_1[m]$ and $E_2[m]$.

Further, the instantaneous modulation value can be taken as the difference between these two functions. Thus, for the bi-phase window function, the watermark $w_e[m]$ can be approximated by:

$$w_e[m] \approx \frac{1}{2\alpha}\left(\frac{E_1[m] - E_2[m]}{E_1[m] + E_2[m]} - 1\right) \quad (17)$$

Consequently, the whitening filter $H_w$ (240B) in FIG. 8 for a bi-phase window shaping function can be realized as shown in FIG. 10. Inputs 242B and 243B respectively receive the energy functions of the first and second half frames $E_1[m]$ and $E_2[m]$. Each energy function is then split up into two, and provided to adders 245B and 246B which respectively calculate $E_1[m]-E_2[m]$, and $E_1[m]+E_2[m]$. Both of these calculated functions are then passed to the calculating unit 24B which divides the value from adder 245B by the value from 246B so as to calculate $w_e[m]$, containing $N_b$ time-multiplexed estimates of the embedded watermark sequences, in accordance with equation 17.

This output $w_e[m]$ is then passed to the buffering and interpolation stage 300, where the signal is de-multiplexed by a de-multiplexer 310, buffered in buffers 320 of length $L_b$, so as to resolve a lack of synchronism between the embedder and the detector, and interpolated within the interpolation unit 330 so as to compensate for a time scale modification between the embedder and the detector.

In order to maximize the possible robustness of a watermark, it is important to make sure that the watermarking system is immune to time offsets between the embedder and the detector. In other words, the watermark detector must be able to synchronize to the watermark sequence inserted in the host signal.

FIG. 11 illustrates the process carried out by the buffering and interpolation stage 300 to resolve the offset issue. The example described illustrates the process for resolving offset when a raised cosine window shaping function has been employed in the watermark embedding process. However, in principle the same technique is applicable when the bi-phase window shaping function has been used.

Referring to FIG. 11, after filtering by the filter $H_b$ 210, the incoming audio signal stream $y'_b[n]$ is separated into preferably overlapping frames 302 of effective length $T_s$ by the frame divider 220.

Preferably, to resolve possible offset between the embedder and the detector, each frame is divided into $N_b$ sub-frames (304a, 304b ..., 304x), and the above computations (equations (12) to (17)) are applied on a sub-frame basis.

Preferably, each sub-frame overlaps with an adjacent sub-frame. In the example shown, it can be seen that there is a 50% overlap ($T_s/N_b$) of each sub-frame (304a, 304b, ..., 304x), with each of the sub-frames being of length $2T_s/N_b$. When overlapping sub-frames are considered, the main frames are preferably longer than the symbol period $T_s$ so as to allow inter-frame overlap as shown in FIG. 11.

The energy of the audio is then computed for each sub-frame by the whitening stage 240, and the resulting values are de-multiplexed into the $N_b$ buffers 320 by the de-multiplexer 310. Each successive one($B_1, B_2, ..., B_{Nb}$) of the buffers 320 will thus contain a sequence of values, with the first buffer $B_1$ containing a sequence of values corresponding to the first sub-frame within each frame, the second buffer $B_2$ containing a sequence of values corresponding to the second sub-frame within each frame etc.

If $w_{Di}$ is the content of the i-th buffer, then it can be shown that:

$$w_{Di}[k] = w_e[k \cdot N_b + i], k \in \{0, ..., L_b-1\} \quad (18)$$

where $L_b$ is the buffer length.

For a raised cosine window shaping function, the energy of the embedded watermark is concentrated near the center of the frame, such that the sub-frame best aligned with the center of the frame will result in a distinctly better estimate of the embedded watermark symbol than all the other sub-frames. Effectively, each buffer thus contains an estimate of the symbol sequence, the estimates corresponding to the sequences having different time offsets.

The sub-frame best aligned with the center of the frame (i.e. the best estimate of the correctly aligned frame) is determined by correlating the contents of each buffer with the reference watermark sequence. The sequence with the maximum correlation peak value is chosen as the best estimate of the correctly aligned frame. The corresponding confidence level, as described below, is used to determine the truth-value of the detection. Preferably, the correlation process is halted once an estimated watermark sequence with a correlation peak above the defined threshold has been found.

Typically, the length of each buffer is between 3 to 4 times the watermark sequence length $L_w$, and is thus typically of length between 2048 and 8192 symbols, and $N_b$ is typically within the range of 2 to 8.

The buffer is normally 3 to 4 times that of the watermark sequence so that each watermark symbol can be constructed by taking the averages of several estimates of said symbol. This averaging process is referred to as smoothing, and the number of times the averaging is done is referred to as the smoothing factor $s_f$. Thus, given the buffer length $L_b$ and the watermark sequence length $L_w$, the smoothing factor $s_f$ is such that:

$$L_b = s_f L_w \quad (19)$$

In another preferred embodiment, the detector refines the parameters used in the offset search based upon the results of a previous search step. For instance, if a first series of estimates shows that the results stored in buffer $B_3$ provide the best estimate of the information signal, then the next offset search (either on the same received signal, or on the signal received during the next detection window) is refined by shifting the position of the sub-frames towards the position of the best estimate sub-frame. The estimates of the sequence having zero offset can thus be iteratively improved.

As shown in FIG. 8, outputs ($w_{D1}, w_{D2}, ... w_{DNb}$) from the buffering stage are passed to the interpolation stage and, after interpolation, the outputs ($w_{I1}, w_{I2}, ... w_{INb}$) of this stage, which are needed to resolve a possible time scale modification in the watermarked signal, are passed to the correlation and decision stage. All of the estimates ($w_{I1}, w_{I2}, ... w_{INb}$) of the watermark corresponding to the different possible offset values are passed to the correlation and decision stage 400.

The correlator 410 calculates the correlation of each estimate $w_{Ij}$, j=1, ..., $N_b$ with respect to the reference watermark sequence $w_c[k]$. Each respective correlation output corresponding to each estimate is then applied to the maximum detection unit 420 which determines which two estimates provided the maximum correlation peak values. These estimates are chosen as the ones that best fit the circularly shifted versions $w_{d1}$ and $w_{d2}$ of the reference watermark. The correlation values for these estimated sequences are passed to the threshold detector and payload extractor unit 430.

The reference watermark sequence $w_s$ used within the detector corresponds to (a possibly circularly shifted version of) the original watermark sequence applied to the host signal. For instance, if the watermark signal was calculated using a random number generator with seed S within the embedder, then equally the detector can calculate the same random number sequence using the same random number generation algorithm and the same initial seed S so as to determine the watermark signal. Alternatively, the watermark signal originally applied in the embedder and utilized by the detector as a reference could simply be any predetermined sequence.

FIG. 12 shows a typical shape of a correlation function as output from the correlator 410. The horizontal scale shows the correlation delay (in terms of the sequence samples). The vertical scale on the left hand side (referred to as the confidence level cL) represents the value of the correlation peak normalized with respect to the standard deviation of the normally distributed correlation function.

As can be seen, the typical correlation is relatively flat with respect to cL, and centered about cL=0. However, the function contains two peaks, which are separated by pL (see equation 6) and extend upwards to cL values that are above the detection threshold when a watermark is present. When the correlation peaks are negative, the above statement applies to their absolute values.

A horizontal line (shown in the FIG. as being set at cL=8.7) represents the detection threshold. The detection threshold value controls the false alarm rate.

Two kinds of false alarms exist: The false positive rate, defined as the probability of detecting a watermark in non watermarked items, and the false negative rate, which is defined as the probability of not detecting a watermark in watermarked items. Generally, the requirement of the false positive alarm is more stringent than that of the false negative. The scale on the right hand side of FIG. 11 illustrates the probability of a false positive alarm b. As can be seen in the example shown, the probability of a false positive b=$10^{-12}$ is equivalent to the threshold cL=8.7, whilst b=$10^{-83}$ is equivalent to cL=20.

After each detection interval, the detector determines whether the original watermark is present or whether it is not present, and on this basis outputs a "yes" or a "no" decision. If desired, to improve this decision making process, a number of detection windows may be considered. In such an instance, the false positive probability is a combination of the individual probabilities for each detection window considered, dependent upon the desired criteria. For instance, it could be determined that if the correlation function has two peaks above a threshold of cL=7 on any two out of three detection intervals, then the watermark is deemed to be present. Such detection criteria can be altered depending upon the desired use of the watermark signal and to take into account factors such as the original quality of the host signal and how badly the signal is likely to be corrupted during normal transmission.

The payload extractor unit 430 may subsequently be utilized to extract the payload (e.g. information content) from the detected watermark signal. Once the unit has estimated the two correlation peaks $cL_1$ and $cL_2$ that exceed the detection threshold, an estimate cL' of the circular shift cL (defined in equation (6)) is derived as the distance between the peaks. Next, the signs $\rho_1$ and $\rho_2$ of the correlation peaks are determined, and hence $r_{sign}$ calculated from equation (7). The overall watermark payload may then be calculated using equation (8).

For instance, it can be seen in FIG. 12 that pL is the relative distance between the two peaks. Both peaks are positive i.e. $\rho_1$=+1, and $\rho_2$=+1. From equation (7), $r_{sign}$=3. Consequently, the payload $pL_w$=<3, pL>.

The symbol extraction and buffering stages described in FIG. 8 can be efficiently implemented by the apparatus 500 shown in FIG. 13. Here, the offset compensation is achieved without any extra computation. It will also be seen that the de-multiplexing is achieved with a simple set of delays and decimation blocks.

First, the incoming frame signal $y_{b,m}$ is subdivided into $N_b$ non-overlapping sub-frames of length $T_s/N_b$ and the energy of each sub-frame is computed using the energy computation unit 230. Secondly, the whitening filter $H_w$ is applied in the whitening unit 240. The combination of the delay unit 510 and the adding unit 520 effectively realizes a 50% overlap between adjacent sub-frames. After the watermark symbol sequence $w_e[m]$ is generated at the output of the adder unit 520, it is subsequently distributed over the $N_b$ buffer unit 320 using the combination of the delay set 512 and the down sampling set 530. This is done such that each buffer gets one value for every $N_b$ in coming samples of $w_e[k]$. For instance, if the first sample goes to $w_{D1}$, the second sample goes to $w_{D2}$, third one to $w_{D3}$, ..., the $N_b$-th one to $w_{DNb}$ and then the ($N_b$+1)-th one goes back to $w_{D1}$ and so on until all the buffers are filled up. Thus the i-th buffer entry $w_{Di}[k]$ may be expressed as $$w_{Di}[k] = w_e[N_b k + i], \quad (20)$$

It is seen that the sampling frequency of $w_{Di}[k]$ is $1/N_b$ times that of $w_e[m]$. This decimation is achieved via the decimating set 532 in FIG. 13.

Since non-overlapping frames are considered in the energy computing unit 230, the total computation needed to generate the $N_b$ sequences is the same as that would have been required if only one sequence with symbols extending over the whole frame was computed.

It will be appreciated by the skilled person that various implementations not specifically described would be understood as falling within the scope of the present invention. For instance, whilst only the functionality of the detecting apparatus has been described, it will be appreciated that the apparatus could be realized as a digital circuit, an analog circuit, a computer program, or a combination thereof.

Equally, whilst the above embodiment has been described with reference to an audio signal, it will be appreciated that the present invention can be applied to add information to other types of signal, for instance information or multimedia signals, such as video and data signals.

Further, it will be appreciated that the invention can be applied to watermarking schemes containing only one watermarking sequence (i.e. a 1-bit scheme), or to watermarking schemes containing multiple watermarking sequences. Such multiple sequences can be simultaneously or successively embedded within the host signal.

Equally, whilst the above detection of the watermark has been described with each estimate being correlated, it will be appreciated that the correlation procedure can be arranged to stop once a positive detection of the watermark has been made. This reduces the offset determination time. Further, the decoder can be arranged to adaptively compensate for time offset, by re-ordering the buffers (or the order in which the buffers are correlated) such that the best aligned buffer in the current detection window will be the first buffer to be correlated in the next detection window.

Within the specification it will be appreciated that the word "comprising" does not exclude other elements or steps, that "a" or "and" does not exclude a plurality, and that a single processor or other unit may fulfil the functions of several means recited in the claims.

The invention claimed is:

1. A method of processing a received signal, the received signal being modified by a sequence of symbols, each symbol extending over $T_s$ signal samples, comprising:
   dividing the received signal into frames;
   dividing each frame into a plurality of $N_b$ sub-frames, wherein each sub-frame overlaps an adjacent sub-frame;
   forming $N_b$ sequences of values, the values being derived from the corresponding sub-frame within each frame; and
   taking said $N_b$ sequences as successive estimates of a frame sequence correctly aligned to the sequence of symbols.

2. The method of claim 1, wherein each frame is of predetermined length $T_s$.

3. The method of claim 1, wherein there is an inter-frame overlap of an adjacent frame.

4. The method of claim 1, wherein $N_b$ lies within the range 2 to 8.

5. The method of claim 1, wherein the sequence of symbols comprises $L_w$ symbols, the received signal being divided into $L_F$ frames, wherein $L_F$ is an integer multiple of $L_w$.

6. The method of claim 1, wherein said sequence of symbols comprises a sequence of values convolved with a window shaping function that has a band limited frequency behavior and is smoothed according to a smoothing factor $S_f$.

7. The method of claim 1, wherein said sequence of symbols comprises a sequence of at least one of raised cosine functions or bi-phase functions.

8. The method of claim 1, wherein said offset is a time offset.

9. The method of claim 1, further comprising processing each estimate as though it were the correctly aligned frame sequence for determining which estimate is a best estimate.

10. The method of claim 9, wherein the best estimate is assumed to be a first estimate that, when processed, exceeds one or more predetermined conditions; said processing of estimates stopping once the best estimate has been determined.

11. The method of claim 10, further comprising:
    correlating each of said estimates with a reference corresponding to said sequence of symbols; and
    taking the estimate with a maximum correlation peak value as the best estimate.

12. The method of claim 9, wherein once a first best estimate has been determined for a first signal or portion of a signal, the method is repeated for a further received signal or portion of a signal, the estimates from said further signal being processed in an order dependent upon said first best estimate.

13. An apparatus arranged to compensate for offset in a received signal, the signal being modified by a sequence of symbols, each symbol extending over $T_s$ signal samples, comprising:
    a divider arranged to divide the received signal into frames;
    a divider arranged to divide each frame into a plurality of $N_b$ sub-frames, wherein each sub-frame overlaps an adjacent sub-frame; and
    a processor arranged to form $N_b$ sequences of values, the values being derived from the corresponding sub-frame within each frame; and to take said $N_b$ sequences as successive estimates of a frame sequence correctly aligned with the sequence of symbols.

14. The apparatus of claim 13, the apparatus further comprising a buffer arranged to store said $N_b$ sequences.

15. A decoder arranged to compensate for offset in a received signal, the signal being modified by a sequence of symbols, each symbol extending over $T_s$ signal samples, comprising:
    a divider arranged to divide the received signal into frames;
    a divider arranged to divide each frame into a plurality of $N_b$ sub-frames, wherein each sub-frame overlaps an adjacent sub-frame; and
    a processor arranged to form $N_b$ sequences of values, the values being derived from the corresponding sub-frame within each frame; and to take said $N_b$ sequences as successive estimates of a frame sequence correctly aligned with the sequence of symbols.

* * * * *